United States Patent [19]

Fruchter et al.

[11] Patent Number: 4,629,503
[45] Date of Patent: Dec. 16, 1986

[54] PROCESS FOR THE RECOVERY OF TUNGSTEN IN A PURE FORM FROM TUNGSTEN-CONTAINING MATERIALS

[75] Inventors: Moshe Fruchter, Haifa; Anutza Moscovici, Rehovot, both of Israel

[73] Assignee: RAMOT - University Authority for Applied Research and Industrial Development, Tel-Aviv, Israel

[21] Appl. No.: 723,879

[22] Filed: Apr. 17, 1985

[51] Int. Cl.$^4$ .............................................. C01G 41/00
[52] U.S. Cl. ...................................... 75/121; 423/53; 423/58; 423/61
[58] Field of Search ................ 423/53, 58, 61; 75/121

[56] References Cited

U.S. PATENT DOCUMENTS

| | | | |
|---|---|---|---|
| 1,293,404 | 2/1919 | Giles et al. | 423/55 |
| 1,614,149 | 1/1927 | Pacz | 423/53 |
| 3,887,680 | 6/1975 | MacInnis et al. | 423/58 |

FOREIGN PATENT DOCUMENTS

| | | | |
|---|---|---|---|
| 148522 | 5/1981 | German Democratic Rep. | |
| 695843 | 8/1953 | United Kingdom | 423/58 |

Primary Examiner—H. T. Carter

Attorney, Agent, or Firm—Frishauf, Holtz, Goodman & Woodward

[57] ABSTRACT

The present invention relates to a simple process for the recovery of pure tungsten at a high yield from cemented tungsten carbide or tungsten alloys scrap. According to the invention the process consists of a series of steps characterized by certain critical parameters.

The steps involved in the process are:

(a) disintegration of the tungsten-containing material in a melt of sodium nitrate, sodium nitrite or mixtures thereof, the amount being substantially stoichiometrical to the tungsten constituent;

(b) precipitation of crystalline calcium tungstate by a solution of calcium chloride, at a temperature in the range of 40 degrees centigrade to 95 degrees centigrade;

(c) transformation of the crystalline calcium tungstate into tungstic acid by concentrated hydrochloric acid obtaining a calcium chloride solution with free hydrochloric acid having a concentration of between 80 g/l to 180 g/l HCl and washing the precipitate to obtain a calcium-free crystalline tungstic acid, and (d) calcination of the crystalline tungstic acid into tungstic oxide followed by its reduction into tungsten metal.

14 Claims, No Drawings

PROCESS FOR THE RECOVERY OF TUNGSTEN IN A PURE FORM FROM TUNGSTEN-CONTAINING MATERIALS

The present invention relates to an improved process for the recovery of tungsten from tungsten-containing materials. More particularly, the invention relates to an improved process for the recovery of tungsten from cemented tungsten carbide or tungsten alloys scrap.

Tungsten is an important valuable metal, obtained chiefly from scheelite which is a calcium salt of tungsten. There are four conventional methods for treating scheelite concentrates: acid decomposition; sodium carbonate digestion in autoclave; fusion with carbonate and digestion with sodium hydroxide. All these methods suffer from relative low yields of recovery and/or very large consumption of reagents and/or a number of purification steps in order to obtain the tungsten in a pure form required for producing the pure metal powder. An important source in the manufacture of pure tungsten, is the scrap of the tungsten-containing materials such as tungsten carbide or mixtures of it with other carbides, used mainly as cutting tool, for sand blast nozzles and wire drawing dies. The recovery of tungsten values from scrap tungsten carbide has been recognized as a problem in the carbide industry and there are a number of patents describing various improvements for the tungsten recovery. Since most of the components present in tungsten-based alloys are extremely valuable, it is most desirable to provide a comprehensive process which will permit on one side a high recovery of the tungsten present therein and on the other side a simple method for the treatment of the by-products in order to recover the other valuable metals.

Cemented carbide tools are made by consolidating extremely hard and fine metal carbide particles together with a suitable binder or cement. Generally, such tools contain tungsten carbide cemented with cobalt although other carbides such as carbides of titanium, vanadium, chromium or molybdenum may also be present.

In order to obtain a good quality of tungsten powder, a pure chemical compound must be first generated, to be subsequently reduced with hydrogen. The chemical procedures to get such a compound are based on a thermal disintegration of the raw material, followed by a number of chemical purification operations. Various methods are encountered in a number of prior patents with varying degrees of success. Thus according to U.S Pat. No. 3,953,194, a process is described for the recovery of tungsten from cemented tungsten carbide wherein the disintegration is obtained by subjecting the metal carbide to a complete oxidation by oxygen in a closed pressure vessel and using a solution of alkali hydroxide in an excess of at least 50% above the amount required to combine with all the tungsten formed. The water soluble tungstate salt is separated from the residue which contained the other valuable metals present in the original material. One of the problems encountered in all these methods is the requirement of an intermediate stage of producing the ammoniumparatungstate (herrafter referred to as APT) salt in order to remove any impurities which normally are accompanying the tungsten values. Although the preparation itself of the APT is not difficult, serious problems are present in the preparation of the pure tungstic acid due to the particular fine crystalline structure—partially in colloidal form—and to its adsorption capacity of metallic ions from the solution.

In addition to that, this preparation does require relatively expensive reagents and corresponding steps of washing and seaparation of the solid precipitate.

According to a recent U.S. Pat. No. 4,256,708, an improvement is described for the process of tungsten recovery from cemented tungsten carbide. According to said improvement, titanium dioxide is incorporated during the digestion operation with the alkali metal hydroxide. It is claimed that the titanium dioxide combines the cobalt present in the carbide, thus providing the formation of the soluble alkali metal tungstate. Although the process claimed seems to improve the recovery yield of the tungsten, it does not overcome the basic problems encountered in the recovery of a pure tungsten oxide and its separation from the other metal constitutents present in the carbide.

According to the East German Pat. No. 148522, cemented tungsten carbide is dissolved in a melt of a mixture of salts consisting of nitrate and nitrite and subsequently leached by water in a number of steps. The alkali solution of tungstate is transformed into calcium tungstate which is further decomposed by HCl treatment intotungstic acid.

There are also other methods described in several patents, but they are not pertinent to the present invention, the decomposition of the scrap tungsten carbide being carried out by chlorine gas (French Pat. No. 2,035,391) or by electrochemical process (Russian Pat. No. 429112).

The above review of the existing prior art, indicates the long felt need for a simple process for the recovery of tungsten in a pure form from tungsten-containing materials, particularly cemented tungsten carbide and scrap containing tungsten, which will result in a high recovery yield of a pure tungsten product free from any metal impurity constituent present in said carbide. It is an object of the present invention to provide a simple process for the recovery of pure tungsten from tungsten containing-materials. It is another object of the present invention to provide a simple process for the recovery of pure tungsten at high recovery yields. It is still another object of the present invention to provide a simple process for the recovery of pure tungsten from tungsten-containing materials, without utilizing the step of APT manufacture. Thus the invention consists of an improved process for the recovery of tungsten from tungsten-containing materials (as hereafter defined) which comprises the steps of:

(1) disintegration of the tungsten-containing material by a melt comprising sodium nitrate obtaining sodium tungstate;

(2) precipitation of calcium tungstate from said sodium tungstate by a solution of calcium chloride;

(3) transformation of the calcium tungstate by a solution of hydrochloric acid in tungstic acid, and (4) calcination of said tungstic acid into tungstic oxide and its reduction into tungsten metal, being characterized by the following critical parameters:

(a) the disintegration of the tungsten-containing material is performed in a melt consisting of a salt selected from sodium nitrate, sodium nitrite or mixtures thereof in a substantially stoichiometrical amount to the tungsten constituent followed by a water leaching of the sodium tungstate;

(b) the precipitation of the crystalline calcium tungstate is performed at a temperature range of between 40° to 95° C.;

(c) the transformation of said crystalline calcium tungstate into crystalline tungstic acid is performed with concentrated hydrochloric acid obtaining a solution of $CaCl_2$ having a concentration of between 80 g/l to 180 g/l free HCl, and (d) the crystalline tungstic acid prior to calcination is substantially free of calcium ion.

It has unexpectedly been found that by a rigorous control of the above critical parameters, crystalline structure of tungstic acid is produced, which can be easily transformed into the pure crystalline tungstic oxide and subsequently reduced into metal tungsten. Any deviation from the above critical parameters, will cause a partial transformation of the crystalline structure into an amorphous one, onto which some of the foreign metal impurities present will be absorbed. These impurities will hinder the production of a pure tungsten oxide in addition to the wasting of said foreign metals which are also valuable components per-se.

The term tungsten-containing material, as utilized in the present specification, means any tungsten raw material and most particularly suitable are cemented tungsten carbide and tungsten alloy scrap. From the last two starting materials, the method enables to recover not only the tungsten component in a very pure form, but also the other valuable metal constituents, from the residue obtained after the separation of the leached sodium tungstate solution.

One of the advantages of the process according to the present invention is the elimination of the step of APT preparation encountered in most of the known process of tungsten recovery. This step is actually utilized in order to purify the tungstic acid from the metal impurities which adhere onto the amorphous particles of tungstic acid. The approach on which the inventors concentrated their research on this subject, was to avoid the formation of amorphous structure of tungstic acid, in which case the step of APT could be eliminated. It was surprisingly found that by a rigorous control of said critical parameters as specified above, only the crystalline form of tungstic acid will be formed, substantially free of the amorphous structure. In this case, the tungstic acid will be of a very pure form and no further purification will be required. This advantage will increase the yield of tungsten recovery, in addition to the appreciable savings of the large amounts of amnonia which are required for the APT preparation. Another advantage of the present invention is the separation and filtration of the crystalline structure of tungstic acid. While the amorphous structure of tungstic acid appears generally in a partial colloidal form, which causes difficulties in its filtration and washing, the crystalline structure can be easily handled, washed and filtered. This of course will also enhance the high yield of recovery.

The entire process is very easy to be carried out and could be applied in any existing plant without requiring any additional equipment, the only provisions being a rigorous control of the critical parameters as specified in the present specification. The first step of the process consists of the disintegration of the tungsten-containing material (tungsten carbide, tungsten-alloy or tungsten scrap) in a melt consisting of a mixture of sodium nitrate—sodium nitrite, as utilized in some of the known methods. However one of the requirements according to the present invention, is to utilize a stoichiometrically amount of Na corresponding to the tungsten content. It was found that, the alkali hydroxide which results by thermal decomposition of the reagent in excess, which remained with the sodium tungstate in the melt, will be transformed by the addition of $CaCl_2$ (in step 2) into calcium This calcium hydroxide will interfere the smooth separation of the calcium tungstate and particularly its washing, so that sodium ions will accompany the tungstic acid and interfere the further steps of pure tungsten manufacture. In order to assure a high yield of d sintegration of the tungsten containing material, it is suggested to perform the desintegration step at high temperatures, preferably in the range of between 680° to 750° C. and in an oxidizing environment.

The solubilization of the melt containing the disintegrated tungsten-containing material is done by water, preferably in small portions using recycled streams of diluted solutions of tungstate so that the aqueous solubilized solutions will contain between 100 to 200 g/l $W^-$, preferably 120–180 g/l W and more preferably between 120 to 160 g/l $W^-$. It was found that with these aqueous solutions, the precipitation of calcium tungstate with calcium chloride solutions occurs completely and smoothly. It is also most preferable that distilled water or deionized water (deprived of calcium ions) will be utilized in order to assure a high rate of tungsten solubilization (the presence of $Ca^+$ ions in the water will precipitate $CaWO_4$). The sodium tungstate is separated from the insolubilized residue containing the other metallic components present in the starting tungsten-containing material, and washed with small portions of deionised water.

The sodium tungstate is treated with a solution of $CaCl_2$ and thus calcium tungstate is formed in the form of an easy filterable and washable precipitate. It is preferred to utilize concentrated solutions of calcium chloride in the range of 400 to 500 g/l $CaCl_2$, slightly above the stoichiometrical amount necessary to form the calcium tungstate. One of the conditions found necessary according to the present invention in order to obtain the calcium tungstate, is its precipitation at a temperature range of between 40° to 95° C. and preferably 80° to 90° C. under a vigorous agitation. Under these conditions, the formed calcium tungstate will be in a substantially pure crystalline form which can be easily decanted and possesses good washing property. Thus the calcium tungstate will be substantially free of foreign cations which normally adhere to the tungsten salt precipitate. The crystalline structure and purity of the calcium tungstate will impart the same properties to the tungstic acid formed in a subsequent step.

The calcium tungstate is dissolved in a solution of hydrochloric acid preferably preheated at 60° C. The amount of hydrochloric acid should be calculated to correspond to the complete transformation of the calcium tungstate into free tungstic acid, the resulting $CaCl_2$ solution containing between 80–180 g/l free HCl. In case that the calcium tungstate contains also small amounts of calcium hydroxide, these should also be taken in account. The final solution will contain the total calcium chloride resulted from the HCl, reaction with calcium tungstate and said calcium hydroxide, together with the free hydrochloric acid at a level of about 80 to 180 g/l. Under these conditions, the hot suspension of the yellow-orange form crystals of tungstic acid in the HCl-$CaCl_2$ solution can be very easily filtered and separated from the mother liquor. This cake can also be easily washed preferably with small portions of acidic water (containing hydrochloric acid) the acidity decreasing from portion to portion. In this manner, the crystalline structure of the tungstic acid will not be affected and thus could be easily separated from the foreign metals (especially calcium ions) present in the mother liquor. Preferably, the acidic washing water utilized, should be obtained from deionized water in order not to introduce any foreign cation ions in the tungstic acid.

The calcination of tungstic acid is done at elevated temperatures, preferably at a temperature in the range of between 800° to 850° C. for a period of between 1 to 3 hours. The tungstic oxide produced, has a purity of above 99.5% $WO_3$ and Scott density of 0.4 g/cc. The granules have a medium size of 0.35-0.4 microns Fischer SSS.

When pure metallic tungsten is required, the tungstic oxide obtained according to the present invention can be reduced in two steps by known methods, and if desired, further treated for the manufacture of tungsten carbide, or used in powder metallurgy for the production of alloys as known in the art.

In order that a person skilled in the art may better understand how the present invention can be practiced, the following Examples are given by way of illustration, but not by way of limitation keeping in mind that Example 2 does not represent the present invention. In the Examples, the concentrations given are by weight, unless otherwise stated.

EXAMPLE 1

An amount of 100 g of tungsten carbide (80% W) scrap was introduced in a cast iron crucible together with an amount of 140 g of melted sodium nitrate and maintained at a temperature in the range of 680° to 700° C. for about 60 minutes. After the disintegration, the melt was poured into a metallic mold for cooling. The cold melt was dissolved in 400 cc of deionized water. After filtering the residue, it was washed with an amount of about 200 cc of deionized water.

The total solution amounting to about 550 cc, containing the sodium tungstate, was heated to boiling and under vigorous agitation, an amount of 120 cc of a solution of $CaCl_2$(500 g/l) was introduced. In order to ensure a complete precipitation of the calcium tungstate a slight excess of the $CaCl_2$ is suggested. The pH during the precipitation should be kept in the range of between 7.8 to 8.0.

After decantation and liquid separation, the slurry was washed with two separate portions each consisting of about 100 cc water; the washed slurry was transferred into a vessel containing about 140 cc of preheated (60° C.) concentrated HCl (33%) and vigorously agitated. At the end of calcium tungstate addition, the agitation was continued for an additional 30 minutes and left for setting for about one hour. The decantation was very fast and a clear solution resulted. The precipitate was separated by filtration and washed with hot acidic deionized water, in small portions, each portion with a continuous decrease in its HCl content beginning with 20 g/l and ending with 2-3 g/l HCl. The wash water from the precipitate should contain less than 20 mg/l $Ca^{++}$, in order to assure a pure tungstic acid. A total of 150-200 cc of acidic liquor was used to purify the tungstic acid. The tungstic acid is further calcined for about 2 hours at a temperature in the range of between 800°-850° C. thus obtaining pure tungstic oxide.

The tungstic oxide was further reduced in a 2 inch tubular reactor with dried pure hydrogen (dew point −25° C.) at a rate of 12 l/min and heated for 20 minutes at 700° C. and 60 minutes at 800° C. The tungsten metal powder obtained had a medium size granule (1-1.2 micron Fischer SSS) and an oxygen content of less then 0.10%.

EXAMPLE 2

Proceeding as above with the same quantities of chemicals and in the same manner, but using in the last step of the process (calcium purification by washing from the tungstic acid) water instead of acidic liquor. A fine suspension appeared in the washing solution, which indicated that the crystalline tungstic acid was transformed from the crystalline form into an amorphous one. The complete removal of the calcium removal was practically impossible. The final tungsten powder obtained contained about 250 ppm $Ca^{++}$ the medium size of granules being 8-12 microns Fischer SSS.

While the invention has been described with specific embodiments thereof, it will be understood that it is capable of further modifications, and this patent is intended to cover any variation, uses or adaptations of the invention and including such departures from the present disclosure as come within known or customary practice in the art to which the invention pertains and as may be applied to the essential features hereinbefore set forth and as fall within the scope of the invention.

We claim:

1. A process for the recovery of tungsten from tungsten-containing materials which comprises the steps of
   (i) admixing the tungsten-containing material with a melt at a temperature of between 680° C. and 750° C., said melt consisting of a salt selected from the group consisting of sodium nitrate, sodium nitrite and mixtures thereof in a substantially stoichiometrical amount to the tungsten constituent of said tungsten-containing material to disintegrate said tungsten-containing material and to form sodium tungstate, cooling said melt, and leaching said cooled melt with water to obtain an aqueous solution of sodium tungstate;
   (ii) admixing a solution of calcium chloride with said aqueous solution of sodium tungstate at a temperature of between 40° C. and 95° C. to form a calcium tungstate prcipitate and separating said calcium tungstate;
   (iii) admixing said calcium tungstate with a preheated concentrated hydrochloric acid solution to form a tungstic acid precipitate and a $CaCl_2$ solution having a concentration of between 80 g/l and 180 g/l free HCl and separating said tungstic acid precipitate and obtaining tungstic acid which is substantially free of calcium ions; and
   (iv) calcining said tungstic acid to convert it to tungstic oxide and reducing said tungstic oxide to form metallic tungsten.

2. The process of claim 1, wherein said aqueous solution of sodium tungstate obtained in step (i) contains between 120 and 180 g/l tungsten.

3. The process of claim 2, wherein said aqueous solution of sodium tungstate is substantially free of a constitutent selected from the group consisting of sodium hydroxide and sodium carbonate.

4. The process of claim 1, wherein the calcium chloride used in step (ii) is in an amount slightly above that stoichiometrically required to precipitate all of the tungsten constituent.

5. The process of claim 1, wherein said calcium chloride solution has a $CaCl_2$ concentration of between 400 and 500 g/l.

6. The process of claim 4, wherein the temperature during the calcium tungstate precipitation in step (ii) is maintained in a range of between 65° C. to 85° C.

7. The process of claim 4, wherein calcium tungstate is precipitated in step (ii) under vigorous agitation.

8. The process of claim 1, wherein said concentrated hydrochloric acid has a concentration of HCl of between 330 and 400 g/l.

9. The process of claim 1, wherein the $CaCl_2$ solution produced in step (iii) contains free hydrochloric acid in an amount between 80 and 150 g/l.

10. The process of claim 1, wherein the separated tungstic acid precipitate is washed with an acidic dionized water to produce a substantially calcium-free tungstic acid.

11. The process according to claim 10, wherein said acidic dionized water is preheated and at a temperature of about 60° C.

12. The process of claim 1, wherein said tungsten-containing material is selected from cemented tungsten carbide and tungsten alloy scrap.

13. The process of claim 3, wherein the calcium chloride used in step (ii) is in an amount slightly above that stoichiometrically required to precipitate all of the tungsten constituent, the temperature during the calcium tungstate precipitation in step (ii) is maintained in a range of between 65° C. to 85° C., said calcium tungstate is precipitated in step (ii) under vigorous agitation, said concentrated hydrochloric acid has a concentration of HCl of between 330 and 400 g/l, the $CaCl_2$ solution produced in step (iii) contains free hydrochloric acid in an amount between 80 and 150 g/l, the separated tungstic acid precipitate is washed with an acidic dionized water to produce a substantially calcium-free tungstic acid, and said tungsten-containing material is selected from cemented tungsten carbide and tungsten alloy scrap.

14. The process of claim 13, wherein said calcium chloride solution has a $CaCl_2$ concentration of between 400 and 500 g/l, and said acidic dionized water is preheated and at a temperature of about 60° C.

* * * * *